US012574612B1

(12) United States Patent
Schifrien et al.

(10) Patent No.: US 12,574,612 B1
(45) Date of Patent: Mar. 10, 2026

(54) CONTENT ITEM PLACEMENT OPTIMIZATION SYSTEM

(71) Applicant: Roku, Inc., San Jose, CA (US)

(72) Inventors: Jason Benjamin Schifrien, New York, NY (US); Youssef Ben Youssef, Long Island City, NY (US); Varun Himamshu, Melrose, MA (US); Scott Huang, New York, NY (US); Arnaud Francis Blanchard, Paris (FR)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/972,394

(22) Filed: Dec. 6, 2024

(51) Int. Cl.
*H04N 21/81* (2011.01)
*H04N 21/422* (2011.01)
*H04N 21/466* (2011.01)

(52) U.S. Cl.
CPC ..... *H04N 21/812* (2013.01); *H04N 21/42203* (2013.01); *H04N 21/4662* (2013.01)

(58) Field of Classification Search
CPC ........... H04N 21/812; H04N 21/42203; H04N 21/4662
See application file for complete search history.

(56) References Cited

U.S. PATENT DOCUMENTS

| | | | | |
|---|---|---|---|---|
| 7,010,685 | B1 * | 3/2006 | Candelore | ........ H04N 21/63345 |
| | | | | 380/280 |
| 7,068,789 | B2 * | 6/2006 | Huitema | ............. H04L 63/1458 |
| | | | | 713/168 |
| 7,614,069 | B2 * | 11/2009 | Stone | ............... H04N 21/25435 |
| | | | | 725/89 |

(Continued)

FOREIGN PATENT DOCUMENTS

| | | |
|---|---|---|
| JP | 2023062605 A | 5/2023 |
| KR | 20220018781 A | 2/2022 |

(Continued)

OTHER PUBLICATIONS

International Search Report and Written Opinion for International Application No. PCT/US2025/041620, mailed on Dec. 3, 2025, 9 pages.

*Primary Examiner* — Michael B. Pierorazio

(74) *Attorney, Agent, or Firm* — STERNE, KESSLER, GOLDSTEIN & FOX P.L.L.C.

(57) ABSTRACT

Disclosed herein are system, method and/or computer program product embodiments, and/or combinations and subcombinations thereof, for optimizing content item placements on a content publisher application of a media device based on multi-publisher content item measurement data associated with a set of media devices. An example embodiment operates by receiving multi-publisher content item measurement data that comprises data signals for a plurality of content items from a plurality of different publishers that are presented at a plurality of different households. A content item, from among the plurality of content items, is determined to be transmitted to a media device of a particular household for presentation via a content publisher application of the media device. In response to determining that the content item is to be transmitted to the media device, the content item is transmitted to the media device for presentation via the content publisher application of the media device.

20 Claims, 6 Drawing Sheets

(56) References Cited

U.S. PATENT DOCUMENTS

| | | | | |
|---|---|---|---|---|
| 7,650,624 | B2 * | 1/2010 | Barsoum | H04N 7/081 |
| | | | | 725/23 |
| 8,032,911 | B2 * | 10/2011 | Ohkita | H04L 61/5038 |
| | | | | 725/74 |
| 8,121,706 | B2 * | 2/2012 | Morikawa | H04L 12/2814 |
| | | | | 725/74 |
| 8,381,310 | B2 * | 2/2013 | Gangotri | H04L 63/10 |
| | | | | 726/32 |
| 9,071,875 | B2 * | 6/2015 | Chow | H04N 21/6405 |
| 10,855,792 | B2 * | 12/2020 | Knox | H04L 67/02 |
| 10,880,351 | B1 * | 12/2020 | Estus | H04N 21/6582 |
| 11,303,943 | B2 * | 4/2022 | Carney Landow | |
| | | | | H04N 21/6332 |
| 11,638,049 | B2 * | 4/2023 | Nonnenmacher | H04N 21/251 |
| | | | | 725/147 |
| 2003/0056093 | A1 * | 3/2003 | Huitema | H04L 67/104 |
| | | | | 713/156 |
| 2004/0117856 | A1 * | 6/2004 | Barsoum | G06Q 30/0207 |
| | | | | 348/E7.071 |
| 2004/0162105 | A1 * | 8/2004 | Reddy | H04W 12/06 |
| | | | | 455/551 |
| 2005/0216942 | A1 * | 9/2005 | Barton | H04N 21/6125 |
| | | | | 348/E7.071 |
| 2005/0283815 | A1 * | 12/2005 | Brooks | H04H 20/78 |
| | | | | 725/127 |
| 2005/0289632 | A1 * | 12/2005 | Brooks | H04N 7/17309 |
| | | | | 725/127 |
| 2006/0010481 | A1 * | 1/2006 | Wall | H04N 7/163 |
| | | | | 725/151 |
| 2006/0111144 | A1 * | 5/2006 | Nakajima | H04L 67/54 |
| | | | | 455/556.1 |
| 2006/0212197 | A1 * | 9/2006 | Butler | B60R 11/0235 |
| | | | | 701/1 |
| 2006/0225105 | A1 * | 10/2006 | Russ | H04N 7/17318 |
| | | | | 348/E7.071 |
| 2007/0050822 | A1 * | 3/2007 | Stevens | H04N 7/14 |
| | | | | 725/74 |
| 2007/0067808 | A1 * | 3/2007 | DaCosta | H04N 21/6581 |
| | | | | 348/E7.071 |
| 2007/0079341 | A1 * | 4/2007 | Russ | H04N 21/43615 |
| | | | | 725/89 |
| 2007/0101185 | A1 * | 5/2007 | Ostrowka | H04N 21/4334 |
| | | | | 714/6.13 |
| 2007/0124775 | A1 * | 5/2007 | DaCosta | H04N 21/6582 |
| | | | | 348/E7.071 |
| 2007/0130601 | A1 * | 6/2007 | Li | H04N 21/6405 |
| | | | | 725/112 |
| 2007/0157281 | A1 * | 7/2007 | Ellis | H04N 21/4147 |
| | | | | 725/74 |
| 2007/0282990 | A1 * | 12/2007 | Kumar | H04L 65/80 |
| | | | | 709/223 |
| 2008/0013919 | A1 * | 1/2008 | Boston | G11B 19/00 |
| 2008/0092168 | A1 * | 4/2008 | Logan | H04N 21/4622 |
| | | | | 725/44 |
| 2008/0134245 | A1 * | 6/2008 | DaCosta | H04N 21/482 |
| | | | | 348/E7.071 |
| 2008/0134256 | A1 * | 6/2008 | DaCosta | H04N 21/43615 |
| | | | | 348/E7.071 |
| 2008/0155615 | A1 * | 6/2008 | Craner | H04N 7/17318 |
| | | | | 348/E7.071 |
| 2008/0178252 | A1 * | 7/2008 | Michaud | H04L 63/083 |
| | | | | 726/1 |
| 2008/0235733 | A1 * | 9/2008 | Heie | H04N 21/482 |
| | | | | 725/46 |
| 2008/0244658 | A1 * | 10/2008 | Chen | H04N 21/47211 |
| | | | | 348/E7.071 |
| 2008/0263611 | A1 * | 10/2008 | Lecomte | H04N 21/47202 |
| | | | | 348/E7.071 |
| 2009/0183199 | A1 * | 7/2009 | Stafford | H04N 7/165 |
| | | | | 725/34 |
| 2009/0205010 | A1 * | 8/2009 | Rodriguez | H04N 21/4402 |
| | | | | 725/151 |
| 2009/0313662 | A1 * | 12/2009 | Rodriguez | H04N 19/39 |
| | | | | 725/87 |
| 2010/0005483 | A1 * | 1/2010 | Rao | H04N 21/63345 |
| | | | | 725/25 |
| 2010/0071076 | A1 * | 3/2010 | Gangotri | G11B 20/00086 |
| | | | | 726/32 |
| 2010/0125876 | A1 * | 5/2010 | Craner | H04N 21/4331 |
| | | | | 725/37 |
| 2011/0191439 | A1 * | 8/2011 | Dazzi | G06F 15/16 |
| | | | | 709/217 |
| 2011/0191446 | A1 * | 8/2011 | Dazzi | H04L 65/612 |
| | | | | 709/219 |
| 2012/0309515 | A1 * | 12/2012 | Chung | H04N 21/4781 |
| | | | | 463/31 |
| 2021/0168416 | A1 * | 6/2021 | Weiner | H04N 21/235 |
| 2023/0038275 | A1 * | 2/2023 | Fieldhouse | H04N 21/222 |
| 2023/0129029 | A1 * | 4/2023 | Carney Landow | H04N 21/812 |
| | | | | 725/139 |
| 2023/0370665 | A1 * | 11/2023 | Webb | H04N 21/2668 |
| 2025/0220284 | A1 * | 7/2025 | Merchant | H04N 21/2353 |

FOREIGN PATENT DOCUMENTS

| | | |
|---|---|---|
| KR | 20220072731 A | 6/2022 |
| KR | 20230105605 A | 7/2023 |
| KR | 102595189 B1 | 10/2023 |

* cited by examiner

300

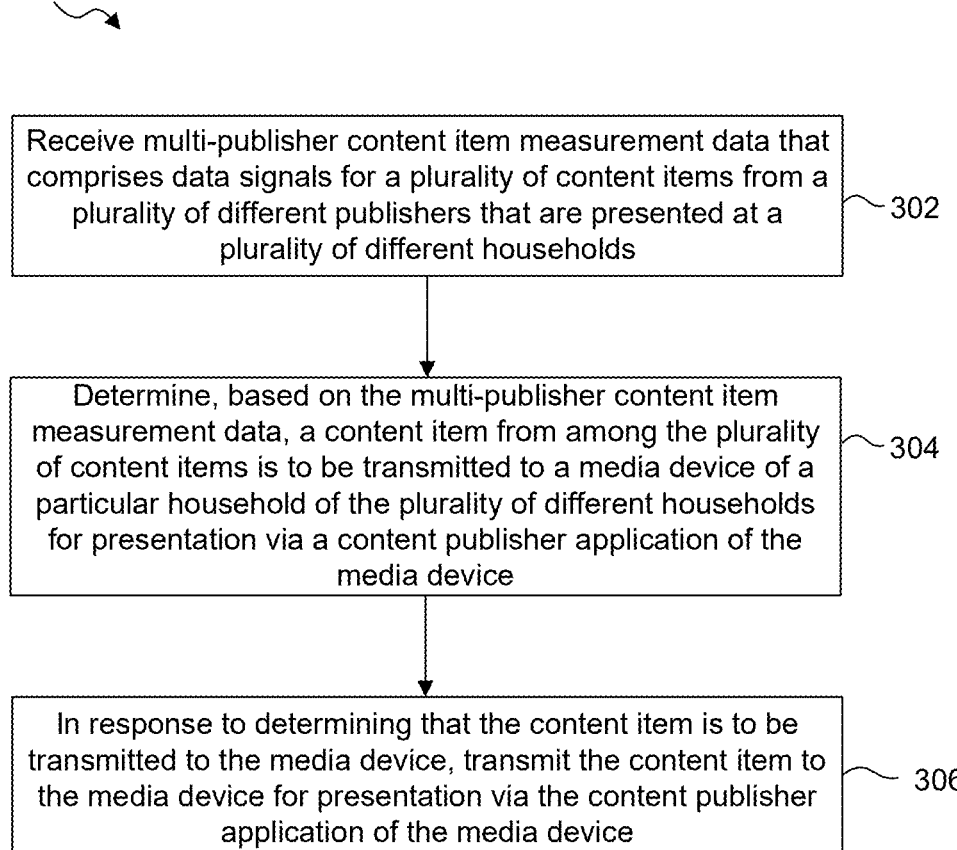

Receive multi-publisher content item measurement data that comprises data signals for a plurality of content items from a plurality of different publishers that are presented at a plurality of different households ~302

Determine, based on the multi-publisher content item measurement data, a content item from among the plurality of content items is to be transmitted to a media device of a particular household of the plurality of different households for presentation via a content publisher application of the media device ~304

In response to determining that the content item is to be transmitted to the media device, transmit the content item to the media device for presentation via the content publisher application of the media device ~306

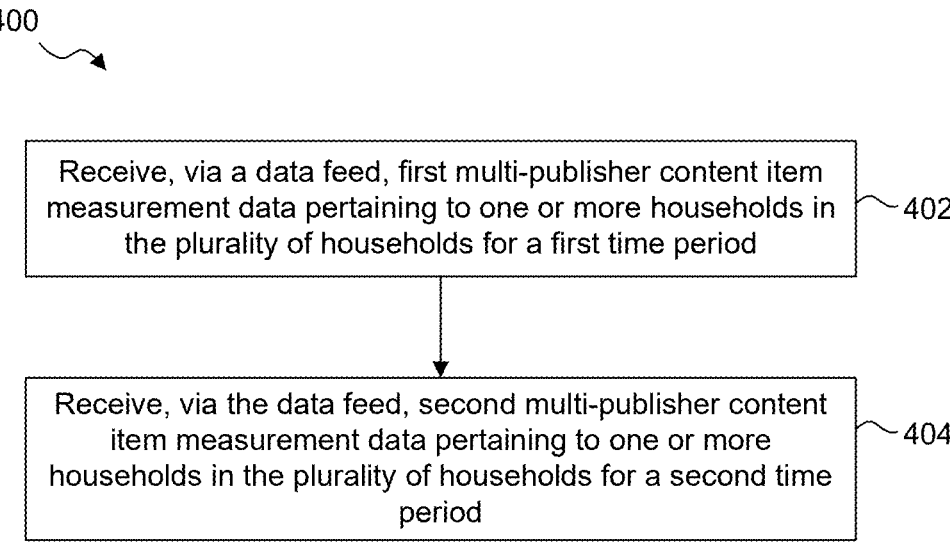

Receive, via a data feed, first multi-publisher content item measurement data pertaining to one or more households in the plurality of households for a first time period ~402

Receive, via the data feed, second multi-publisher content item measurement data pertaining to one or more households in the plurality of households for a second time period ~404

FIG. 4

Determine, based at least on the multi-publisher content item measurement data, that presenting the content item via the content publisher application of the media device will increase an incremental reach of a campaign associated with the content item ~500

FIG. 5

Determine, based at least on the multi-publisher content item measurement data, that presenting the content item via the content publisher application of the media device will increase a probability of a user conversion ⌐∿600

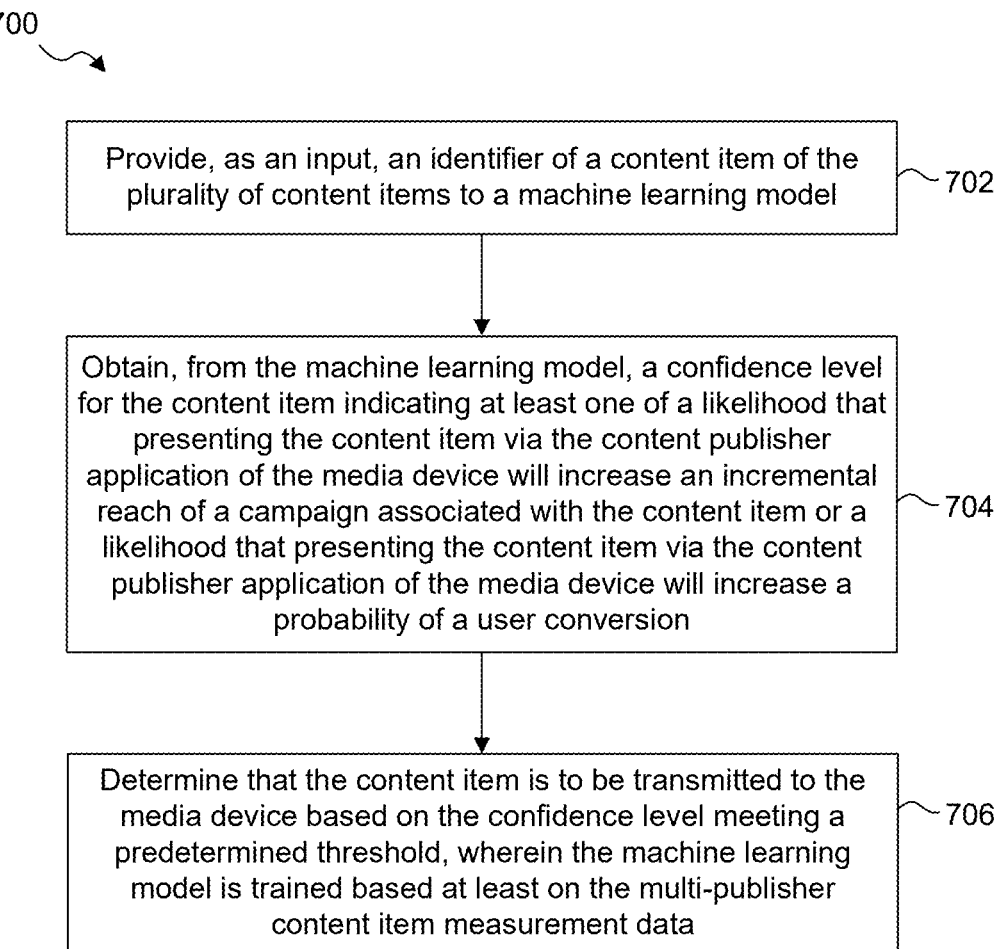

Provide, as an input, an identifier of a content item of the plurality of content items to a machine learning model ⌐∿702

Obtain, from the machine learning model, a confidence level for the content item indicating at least one of a likelihood that presenting the content item via the content publisher application of the media device will increase an incremental reach of a campaign associated with the content item or a likelihood that presenting the content item via the content publisher application of the media device will increase a probability of a user conversion ⌐∿704

Determine that the content item is to be transmitted to the media device based on the confidence level meeting a predetermined threshold, wherein the machine learning model is trained based at least on the multi-publisher content item measurement data ⌐∿706

FIG. 7

CONTENT ITEM PLACEMENT OPTIMIZATION SYSTEM

BACKGROUND

Field

This disclosure is generally directed to techniques for selecting content items for presentation to users via a content publisher application of a media device.

SUMMARY

Provided herein are system, apparatus, article of manufacture, method and/or computer program product embodiments, and/or combinations and sub-combinations thereof, for optimizing content item placements on a content publisher application of a media device based on multi-publisher content item measurement data associated with a set of media devices. An example embodiment operates by receiving multi-publisher content item measurement data that comprises data signals for a plurality of content items from a plurality of different publishers that are presented at a plurality of different households; determining, based on the multi-publisher content item measurement data, a content item from among the plurality of content items is to be transmitted to a media device of a particular household of the plurality of different households for presentation via a content publisher application of the media device; and in response to determining that the content item is to be transmitted to the media device, transmitting the content item to the media device for presentation via the content publisher application of the media device.

In some aspects, receiving the multi-publisher content item measurement data pertaining to each household in the plurality of households comprises: receiving, via a data feed, first multi-publisher content item measurement data pertaining to one or more households in the plurality of households for a first time period, and receiving, via the data feed, second multi-publisher content item measurement data pertaining to one or more households in the plurality of households for a second time period.

In some aspects, the data signals comprise at least one of information concerning content item impressions with respect to the plurality of content items that occurred via the media device, or information concerning content item impressions with respect to the plurality of content items that occurred at each of the plurality of households at which other media devices are located. The information concerning the content item impression that occurred via the media device may include, for example, a value that indicates that the content item impression occurred via one of the content publisher application of the media device, a third-party content publisher application of the media device, or linear programming viewed via the media device. The data signals may further include at least one of information concerning user conversions with respect to the plurality of content items that was attributed to the particular household at which the media device is located, or information concerning user conversions with respect to the plurality of content items that was attributed to each of the plurality of households at which other media devices are located.

In some aspects, determining, based on the multi-publisher content item measurement data, a content item from among the plurality of content items is to be transmitted to a media device of a particular household of the plurality of different households for presentation via a content publisher application of the media device comprises determining, based at least on the multi-publisher content item measurement data, that presenting the content item via the content publisher application of the media device will increase an incremental reach of a campaign associated with the content item.

In some aspects, determining, based on the multi-publisher content item measurement data, a content item from among the plurality of content items is to be transmitted to a media device of a particular household of the plurality of different households for presentation via a content publisher application of the media device comprises determining, based at least on the multi-publisher content item measurement data, that presenting the content item via the content publisher application of the media device will increase a probability of a user conversion.

In some aspects, determining, based at least on the multi-publisher content item measurement data, that presenting the content item via the content publisher application of the media device will increase a probability of a user conversion comprises providing, as an input, an identifier of a content item of the plurality of content items to a machine learning model; obtaining, from the machine learning model, a confidence level for the content item indicating at least one of a likelihood that presenting the content item via the content publisher application of the media device will increase an incremental reach of a campaign associated with the content item or a likelihood that presenting the content item via the content publisher application of the media device will increase a probability of a user conversion; and determining that the content item is to be transmitted to the media device based on the confidence level meeting a predetermined threshold, wherein the machine learning model is trained based at least on the multi-publisher content item measurement data.

BRIEF DESCRIPTION OF THE FIGURES

The accompanying drawings are incorporated herein and form a part of the specification.

FIG. 3 illustrates a flow diagram of a method for optimizing content item placements on a content publisher application of a media device based on multi-publisher content item measurement data associated with a set of media devices, according to some embodiments.

FIG. 4 illustrates a flow diagram of a method by which a content item serving system receives multi-publisher content item measurement data associated with a set of media devices, according to some embodiments.

FIG. 5 illustrates a flow diagram of a method for determining a content item from among a plurality of content items for presentation via a content publisher application of a media device based at least on multi-publisher content item measurement data, according to some embodiments.

FIG. 6 illustrates a flow diagram of another method for determining a content item from among a plurality of content items for presentation via a content publisher application of a media device based at least on multi-publisher content item measurement data, according to some embodiments.

FIG. 7 illustrates a flow diagram of yet another method for determining a content item from among a plurality of content items for presentation via a content publisher application of a media device based at least on multi-publisher content item measurement data, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
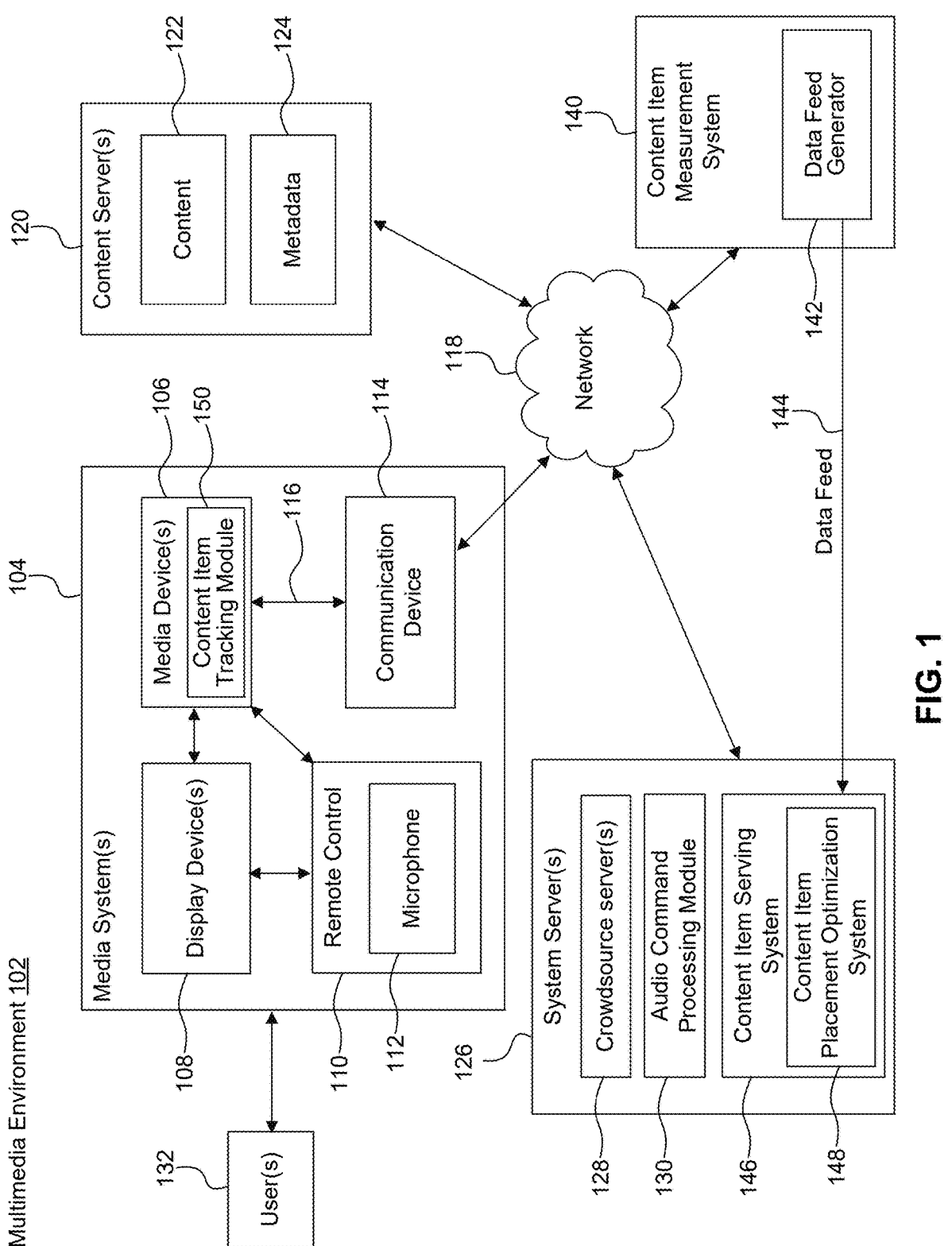
FIG. 1 illustrates a block diagram of a multimedia environment that includes a content item placement optimization system, according to some embodiments.

Systems exist that selectively deliver content items (e.g., advertisements) to media devices for presentation to a user thereof. For example, a conventional advertisement ("ad") serving system may be used or operated by a content publisher (e.g., a digital media company, a social media company, or the like) to selectively deliver ads to users that are consuming (e.g., viewing) content published by the content publisher. For example, such ads may be presented to a user when the user is viewing a television show or movie published by the content publisher (e.g., via an application ("app") of the content publisher that is installed on a media device).

Improving future ad placement decisions may involve, for example, optimizing ad placements to achieve a particular outcome for advertisers, such as increasing marketing reach or increasing user conversions. However, a significant challenge presented by this typical scenario is that the content publisher has no way of determining which ads have already been served on their users by other content publishers. For example, in accordance with the scenario, the content publisher cannot know if a user has already observed an ad within the context of a different content publisher application, while watching linear (e.g., broadcast or cable) television, or via some other platform or distribution channel that is not owned or operated by the content publisher. The content publisher only knows which ads were served along with its own content. This inability of the content publisher to know which ads a user has or hasn't already seen means that the content publisher has insufficient information to make optimal ad placement decisions for achieving desired advertiser outcomes.

Some systems exist that are capable of measuring the effectiveness of ads across multiple content publisher applications and platforms as well as across other distribution channels such as linear television. These systems leverage various technologies (e.g., web beacons, automatic content recognition (ACR), etc.) to obtain signals from which ad impressions and, in some cases, user conversions, can be tracked. However, these systems are typically used only to generate reports concerning ad effectiveness. Marketing personnel may then utilize such reports to make future decisions about which ads to distribute and through which distribution channels, but these decisions are taken at a high level and must be manually implemented. These systems are not tied into an ad serving system and the measurements generated by such systems are not used for making automated ad placement decisions on a household-by-household or device-by-device basis.

Provided herein are system, apparatus, article of manufacture, method and/or computer program product embodiments, and/or combinations and sub-combinations thereof, for optimizing content item (e.g. ad) placements on a content publisher application of a media device (or other content publisher platform or distribution channel). An example implementation receives (e.g., via a data feed from a content item measurement system) multi-publisher content item measurement data that comprises data signals for a plurality of content items from a plurality of different publishers that are presented at a plurality of different households. The example implementation determines, based on the multi-publisher content item measurement data, a content item from among the plurality of content items is to be transmitted to a media device of a particular household of the plurality of different households for presentation via a content publisher application of the media device. The example implementation then, in response to determining that the content item is to be transmitted to the media device, transmits the content item to the media device for presentation via the content publisher application of the media device.

As will be discussed in more detail herein, the aforementioned implementation enables a content publisher's content item (e.g., ad) serving system to leverage the multi-publisher content item measurement data to determine, for example, which content items have already been served on their users by other content publishers. For example, by receiving the multi-publisher content item measurement data (e.g. via a data feed), the content publisher's content item serving system can determine that a user has already observed an ad within the context of a different content publisher application. Having this additional information enables the content publisher's content item serving system to better optimize ad placement decisions to achieve desired advertiser outcomes, such as increased marketing reach or increased user conversions.

These and various other features and advantages of a system, method and/or computer program product, and/or combinations and sub-combinations thereof, for optimizing content item placements on a content publisher application (or other platform or channel) of a media device will be described in detail herein in reference to various embodiments. Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to,"

"attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as Wi-Fi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106 and/or display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106 and/or display device 108 using cellular, Bluetooth, infrared, etc., or any combination thereof. Remote control 110 may include a microphone 112.

Multimedia environment 102 may include a plurality of content servers 120 (also called content providers, channels or sources 120). Although only one content server 120 is shown in FIG. 1, in practice multimedia environment 102 may include any number of content servers 120. Each content server 120 may be configured to communicate with network 118. Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form. In some embodiments, content server(s) 120 may include a live streaming content origin server and content 122 may comprise live streaming content.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to content 122. Metadata 124 may also or alternatively include one or more indexes of content 122, such as but not limited to a trick mode index.

Multimedia environment 102 may include one or more system servers 126. System servers 126 may operate to support media devices 106 from the cloud. It is noted that the structural and functional aspects of system servers 126 may wholly or partially exist in the same or different ones of system servers 126.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132 watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streamings of the movie.

System servers 126 may also include an audio command processing module 130. As noted above, remote control 110 may include microphone 112. Microphone 112 may receive audio data from users 132 (as well as other sources, such as the display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize user 132's verbal command. Audio command processing module 130 may then forward the verbal command back to media device 106 for processing.

Figure 2:
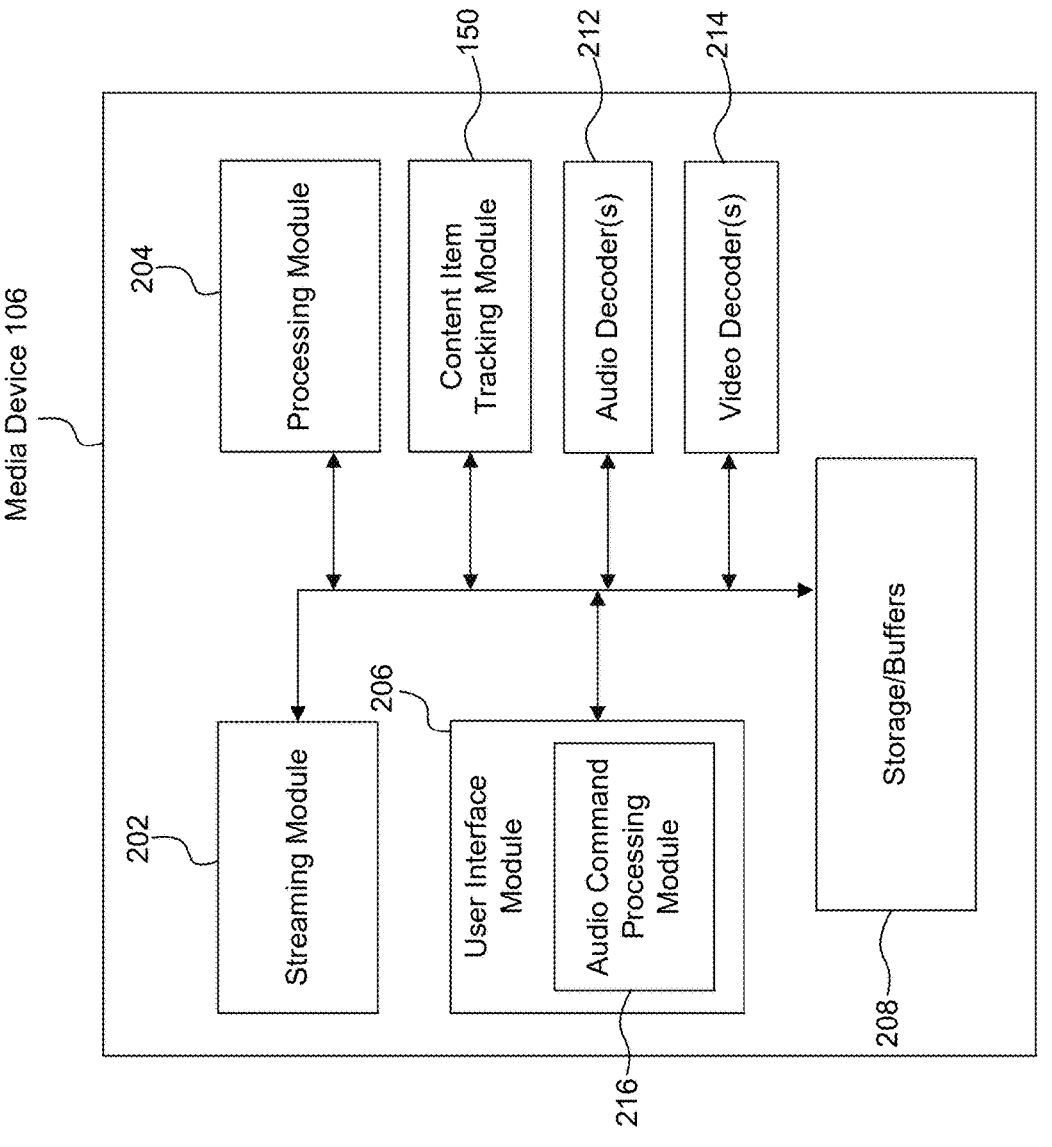
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132.

In streaming embodiments, streaming module 202 may transmit the content to display device 108 in real time or near real time as it receives such content from content server(s) 120. In non-streaming embodiments, media device 106 may store the content received from content server(s) 120 in storage/buffers 208 for later playback on display device 108.

Content Item Placement Optimization System

As further shown in FIG. 1, system server(s) 126 further include a content item serving system 146. Content item serving system 146 may be configured to determine (e.g., select) content items (e.g., ads) to be transmitted to media device 106 so that such content items may be presented to user 132 via a content publisher application of media device 106. For example, user 132 may interact with a content publisher application of media device 106 via a user interface thereof to cause content (e.g., a television show, a movie, a televised sporting event, or the like) published by the content publisher to be streamed from content server(s) 120 to media device 106. Media device 106 may then present the content to user 132 via display device 108 in a manner previously described. Content items selected by content item serving system 146 may also be transmitted to media device 106 so that such content items may be displayed to user 132 during designated breaks (e.g., ad breaks) in the content being streamed and/or via a home screen of a media streaming application of media device 106. Such content items may be transmitted directly from content item serving system 146 to media device 106, or, alternatively, content item serving system 146 may send media device 106 information (e.g., an identifier such as a URL) associated with a content item and media device 106 may retrieve the content item from an entity on network 118 using the information.

Content item serving system 146 itself includes a content item placement optimization system 148 that is configured to select the content items to be transmitted to media device 106 for presentation via the content publisher application. To select the content items, content item placement optimization system 148 utilizes an optimization algorithm that is configured to achieve a desired advertiser outcome, such as but not limited to an increased marketing reach of an ad campaign or increased user conversions. As will be discussed below, content item placement optimization system

148 is configured to use a data feed 144 from a content item measurement system 140 in order to perform this function.

As also shown in FIG. 1, multimedia environment 102 also includes content item measurement system 140. Content item measurement system 140 is a system that operates (e.g., on behalf of advertisers) to measure an effectiveness of content items (e.g., ads) across multiple content publisher applications and platforms as well as across other distribution channels such as linear television. Content item measurement system 140 may be configured to leverage various technologies (e.g., web beacons, automatic content recognition (ACR), etc.) to obtain signals from which ad impressions and, in some cases, user conversions, can be tracked.

For example, as shown in FIGS. 1 and 2, media device 106 may include a content item tracking module 150 that is configured to transmit information to content item measurement system 140 that indicates that a particular content item has been presented by media device 106 to display device 108, which may be referred to herein as an impression. Such information may comprise, for example and without limitation, a web beacon, ACR information, or any other information that may be used to indicate that a particular content item has been displayed. Such information may also include a time at which the media content was present and/or various demographic information associated with the user to whom the content item was provided. The demographic information may include, but is not limited to, the gender of the user, the income of the user, the location of the user, the age of the user, a lifestyle of the user (e.g., spending habits, travel habits, likes, dislikes, etc.), and/or any other type information that is specific to the user. Other media devices across a multitude of households may also include an instance of content item tracking module 150, or similar logic, and each such media device may provide information to content item measurement system 140 indicating that a particular content item has been displayed. Content item measurement system 140 may be configured to associate a detected content item impression with a household that includes one or more media devices.

Content item measurement system 140 may also be configured to determine when a user has taken an action that is of interest to an advertiser, which may be referred to herein as a user conversion. A user conversion may entail a user clicking on an ad, visiting a website, creating an account, adding an item to an online shopping cart, purchasing a product or service, purchasing an application, downloading an application, visiting a real world location, or any of a wide variety of other user actions that may be of interest to an advertiser. Content item measurement system 140 may be further configured to associate a user conversion with a household that includes one or more media devices.

Content item measurement system 140 may utilize the aforementioned content item impression and user conversion information to generate reports for advertisers concerning, for example, the effectiveness of their ad campaigns.

Content item measurement system 140 includes a data feed generator 142. Data feed generator 142 is configured to generate a data feed 144 through which data is periodically or intermittently provided to content item serving system 146, wherein the data provided comprises multi-publisher content item measurement data for one or more households in a plurality of households accrued over a particular time period. The data provided via data feed 144 is used by content item placement optimization system 148 in a manner that will be described herein.

In one example, data feed 144 may comprise a report of content item impressions across multiple publisher platforms during a previous time period for one or more households in a plurality of households. Data feed 144 may also include a report of user conversions attributed to one or more households in the plurality of households during a previous time period. Such reports may be generated, for example, on a periodic basis, such as an hourly basis, a daily basis, or at any other frequency. Data feed 144 may also specify demographic information associated with the users of the one or more households The frequency with which data feed 144 is updated and the time period covered by each report may vary from implementation to implementation. However, it may be deemed desirable to update data feed 144 as frequently as possible with the most recently acquired content item impression and user conversion data so as to improve the performance of content item placement optimization system 148.

In certain implementations, the content item impression and/or user conversion data included within a given report that is provided via data feed 144 may be specified on a household-by-household basis. A household may be identified using one or more household identifiers. Each household may itself include or otherwise be associated with one or more media devices (e.g., one or more media devices 106), and each such media device may have its own media device identifier(s). A mapping of media device identifier(s) to household identifier(s) may be provided by a content publisher associated with content item serving system 148 to an entity that operates content item measurement system 140. This may enable content item measurement system 140 to attribute content item impressions and user conversions for a particular media device to a particular household. Likewise, this may enable content item placement optimization system 148 to utilize household-specific content item impression and user conversion data to make ad placement decisions for specific media devices.

In certain implementations, data feed 144 comprises a content item impression feed. The content item impression feed may include a record for each content item impression detected for a household over a particular time period. A record for a content item impression may include various data fields such as but not limited to: content item measurement system household ID; content item serving system household ID; ad campaign ID; deal ID; advertiser (brand) ID; content item (or "ad") ID, impression timestamp; publisher; device type; and content item impression ID. The publisher data field may indicate whether the impression occurred via the content publisher application of a media device associated with the household, via a third-party content publisher application of a media device associated with the household, or via linear programming viewed via a media device associated with the household.

In certain implementations, data feed 144 may further comprise a user conversion feed. The user conversion feed may include a record for each user conversion attributed to a household over a particular time period. A record for a user conversion may include various data fields such as but not limited to: content item measurement system household ID; content item serving system household ID; conversion ID; ad campaign ID; deal ID; advertiser (brand) ID; content item (or "ad") ID, conversion type (e.g., add to cart, web visit, application download, application sale, etc.); application type (e.g., web or application); and conversion time stamp.

The data conveyed via data feed 144 may be conveyed in a variety of ways. For example, periodically-generated batch files may be stored by data feed generator 142 in a network-accessible (e.g., cloud-based) storage system or device, and content item serving system 146 may be configured to access such system or device (e.g., using a predetermined network address) to retrieve the batch files therefrom. Alternatively, the data may be transmitted directly from data feed generator 142 to content item serving system 148 using a suitable file transfer protocol. Still other techniques may be used to transfer the data from data feed generator 142 to content item serving system 146 as will be appreciated by persons skilled in the relevant art(s).

Content item placement optimization system 148 is configured to utilize the data provided via data feed 144 to make content item placement decisions that optimize (e.g., increase a chance of) achieving a particular outcome for an advertiser. Such an outcome may comprise, for example, increasing an incremental reach of an ad campaign, or increasing a number or rate of user conversions. However, these are only examples, and other outcomes may be pursued.

In particular, when content item serving system 146 determines that a content item (e.g., an ad) is to be served to media device 106 for presentation by a content publisher application of media device 106, content item serving system 146 provides one or more identifiers of media device 106 to content item placement optimization system 148. Content item placement optimization system 148 is configured to use the media device identifier(s) to determine a particular household with which media device 106 is associated. Content item placement optimization system 148 is further configured to select a content item from among a plurality of eligible content items for presentation via the content publisher application of media device 106 based at least on multi-publisher content item measurement data (received via data feed 144) for the particular household.

By way of example, if the desired outcome for an advertiser or a publisher is increasing the incremental reach of an ad campaign, then content item placement optimization system 148 may be configured to determine whether a desired number of impressions of a content item associated with the ad campaign have already occurred within the particular household. The multi-publisher content item measurement data for the particular household may provide such information, even in a case in which the impression(s) occurred on a third-party publisher platform/application or during linear broadcasting, and even in a case in which the impression(s) occurred on different media devices in the same household. If the desired number of impressions have already occurred with respect to the particular household, then content item placement optimization system 148 may determine that the content item associated with the ad campaign should not be sent to media device 106, since such content item placement may be deemed not to increase the incremental reach of the ad campaign. However, if the desired number of impressions have not yet occurred with respect to the particular household, then content item placement optimization system 148 may determine that the content item associated with the ad campaign should be sent to media device 106, since such content item placement may be deemed to increase the incremental reach of the ad campaign.

As another example, if the desired outcome for an advertiser is increasing a number or rate of user conversions, then content item placement optimization system 148 may be configured to determine whether a user conversion with respect to a particular content item or ad campaign has already occurred with respect to the particular household. If such a user conversion has already occurred with respect to the particular household, then content item placement optimization system 148 may determine that the content item associated with the ad campaign should not be sent to media device 106, since such content item placement may be deemed not to increase a probability of a user conversion. However, if a user conversion has not yet occurred with respect to the particular household, then content item placement optimization system 148 may determine that the content item associated with the ad campaign should be sent to media device 106, since such content item placement may be deemed to increase a probability of a user conversion.

The foregoing are only examples, and persons skilled in the relevant art(s) will readily appreciate that content item placement optimization system 148 may utilize the multi-publisher content item measurement data received via data feed 144 to optimize content item placements in other ways to achieve other types of advertiser objectives and key performance indicators.

In certain implementations, content item placement optimization system 148 may be configured to utilize a machine learning model to determine a content item from among a plurality of content items for presentation via the content publisher application of a media device 106, wherein the machine learning model is trained based at least on the multi-publisher content item measurement data received via data feed 144. Such machine learning model may be trained based on the data received via data feed 144, for example, to predict which ad placements are most likely to achieve a desired advertiser outcome, such as but not limited to increased marketing reach or increased number or rate of user conversions. For example, content item placement optimization system 148 provides, as an input, representations (e.g., content item IDs) of potential content items to the machine learning model. The machine learning model may be configured to generate, for each potential content item, a confidence level (e.g., a value between 0.0 and 1.0) for the content item indicating at least one of a likelihood that presenting the content item via the content publisher application of media device 106 will increase an incremental reach of a campaign associated with the content item or a likelihood that presenting the content item via the content publisher application of media device 106 will increase a probability of a user conversion. Content item placement optimization system 148 may be configured to compare the confidence level to a predetermined threshold. In certain embodiments, content item placement optimization system 148 may determine the content item to be transmitted to media device 106 based on whether the content item meets (e.g., reaches or exceeds) the predetermined threshold. In such embodiments, content item placement optimization system 148 selects content item(s) that meet the predetermined threshold for transmission to media device 106. In certain embodiments, the content item with the highest confidence level is determined to be transmitted to media device 106.

FIG. 3 illustrates a flow diagram of a method 300 for optimizing content item placements on a content publisher application of a media device based on multi-publisher content item measurement data associated with a set of media devices, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to components of multimedia environment 102 of FIGS. 1 and 2. However, method 300 is not limited to that example embodiment.

In 302, content item serving system 146 receives from content item measurement system 140 multi-publisher content item (e.g. ad) measurement data that comprises data signals for a plurality of content items from a plurality of different publishers that are presented at a plurality of households. This multi-publisher content item measurement data may be received as part of a data feed 144 that is generated by data feed generator 142 of content item measurement system 140 and transferred from content item measurement system 140 to content item serving system 146 using one of a variety of data sharing techniques previously described herein.

In 304, content item placement optimization system 148 of content item serving system 146 determines, based on the multi-publisher content item measurement data, a content item from among the plurality of content items is to be transmitted to media device 106 of a particular household of the plurality of different households for presentation via a content publisher application of media device 106.

In 306, content item placement optimization system 148, in response to determining that the content item is to be transmitted to media device 106, transmits the content item to media device 106 for presentation via the content publisher application of media device 106.

The data signals may comprise at least one of information concerning content item impressions with respect to the plurality of content items that occurred via media device 106 or information concerning content item impressions with respect to the plurality of content items that occurred at each of the plurality of households at which other media devices are located. Among other data fields, the information concerning a content item impression may include a value that indicates that the content item impression occurred via one of the content publisher application of the media device, a third-party content publisher application of the media device, or linear programming viewed via the media device. The data signals may also comprise at least one of information concerning user conversions with respect to the plurality of content items that was attributed to the particular household at which media device 106 is located or information concerning user conversions with respect to the plurality of content items that was attributed to each of the plurality of households at which other media devices are located.

FIG. 4 illustrates a flow diagram of a method 400 by which a content item serving system receives multi-publisher content item measurement data associated with a set of media devices, according to some embodiments. Method 400 may represent, for example, one manner of determining 304 of method 300 of FIG. 3. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to components of multimedia environment 102 of FIGS. 1 and 2. However, method 400 is not limited to that example embodiment.

In 402, content item serving system 146 receives via data feed 144 first multi-publisher content item measurement data pertaining to one or more households in the plurality of households for a first time period.

In 404, content item serving system 146 receives via data feed 144 second multi-publisher content item measurement data pertaining to one or more households in the plurality of households for a second time period.

FIG. 5 illustrates a flow diagram of a method 500 for selecting a content item from among a plurality of content items for presentation via a content publisher application of a media device based at least on multi-publisher content item measurement data, according to some embodiments. Method 500 may be performed, for example, as part of determining 304 of method 300 of FIG. 3. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to components of multimedia environment 102 of FIGS. 1 and 2. However, method 500 is not limited to that example embodiment.

In 500, content item placement optimization system 148 of content item serving system 146 determines, based at least on the multi-publisher content item measurement data, that presenting the selected content item via the content publisher application of media device 106 will increase an incremental reach of a campaign associated with the selected content item.

FIG. 6 illustrates a flow diagram of a method 600 for selecting a content item from among a plurality of content items for presentation via a content publisher application of a media device based at least on multi-publisher content item measurement data, according to some embodiments. Method 600 may be performed, for example, as part of determining 304 of method 300 of FIG. 3. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to components of multimedia environment 102 of FIGS. 1 and 2. However, method 600 is not limited to that example embodiment.

In 600, content item placement optimization system 148 of content item serving system 146 determines, based at least on the multi-publisher content item measurement data, that presenting the selected content item via the content publisher application of media device 106 will increase a probability of a user conversion.

FIG. 7 illustrates a flow diagram of a method 700 for determining a content item from among a plurality of content items for presentation via a content publisher application of a media device based at least on multi-publisher content item measurement data, according to some embodiments. Method 700 may be performed, for example, as part of determining 304 of method 300 of FIG. 3. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to components of multimedia environment 102 of FIGS. 1 and 2. However, method 700 is not limited to that example embodiment.

In 702, content item placement optimization system 148 of content item serving system 146 provides, as an input, an identifier of a content item of the plurality of content items to a machine learning model. The machine learning model may be incorporated as part of content item placement optimization system 148. Alternatively, the machine learning model may be provided as a standalone service that executes on one of system server(s) 126 (e.g., the same or different system server on which content item serving system 146 executes).

In 704, content item placement optimization system 148 obtains, from the machine learning model, a confidence level for the content item indicating at least one of a likelihood that presenting the content item via the content publisher application of media device 106 will increase an incremental reach of a campaign associated with the content item or a likelihood that presenting the content item via the content publisher application of media device 106 will increase a probability of a user conversion.

In 706, content item placement optimization system 148 determines that the content item is to be transmitted to media device 106 based on the confidence level meeting (e.g., reaches or exceeds) a predetermined threshold. The machine learning model may be trained based at least on the multi-publisher content item measurement data.

Example Computer System

Figure 8:
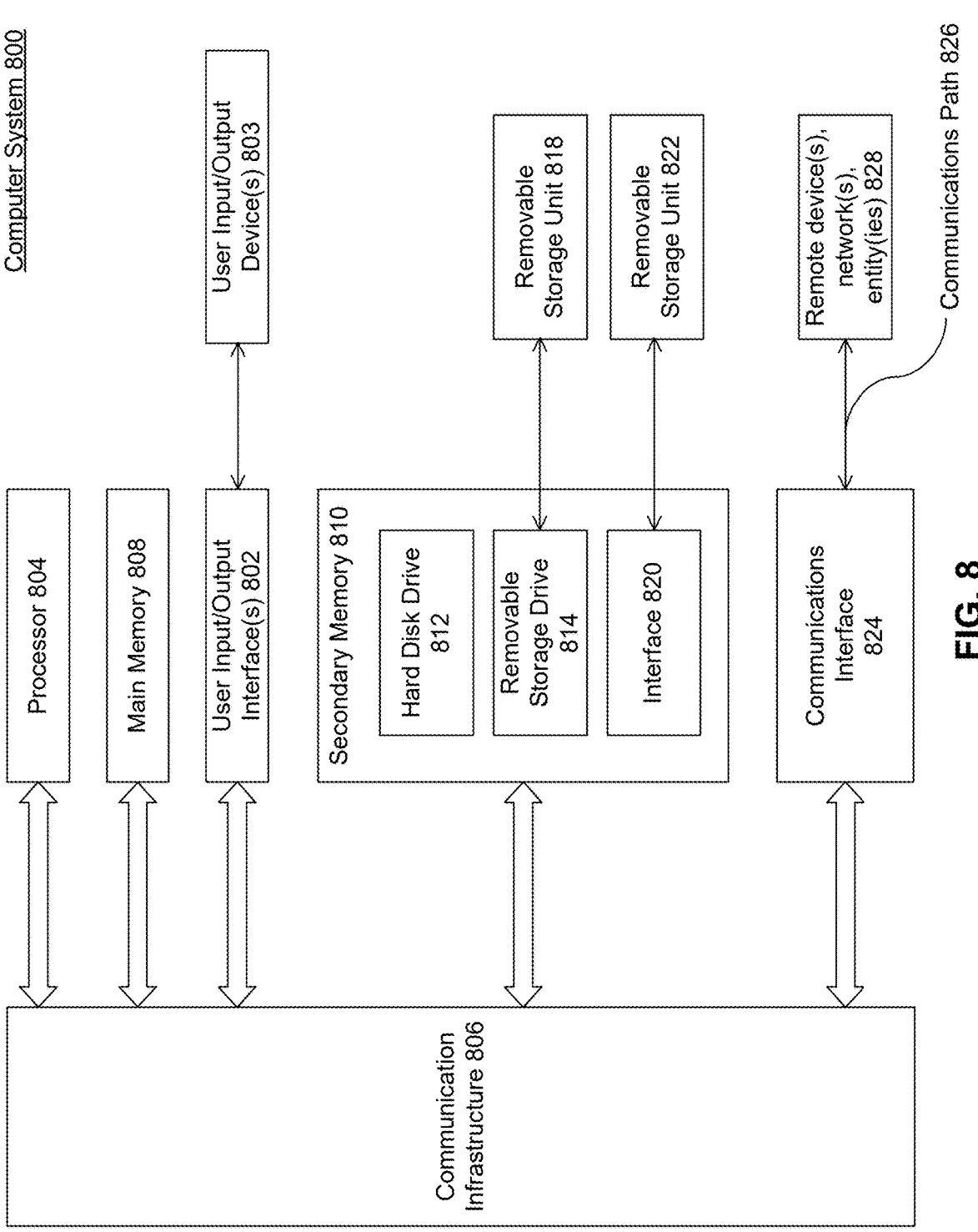
FIG. 8 illustrates an example computer system useful for implementing various embodiments.

Various embodiments may be implemented, for example, using one or more well-known computer systems, such as computer system 800 shown in FIG. 8. For example, one or more of media device(s) 106, remote control 110, content server(s) 120, system server(s) 126, content item serving system 146, content item placement optimization system 148, content item measurement system 140, or data feed generator 142 may be implemented using computer system 800. Furthermore, one or more features of method 300, method 400, method 500, method 600 or method 700 may be implemented using computer system 800. Alternatively, one or more computer systems 800 may be used, for example, to implement any of the embodiments discussed herein, as well as combinations and sub-combinations thereof.

iComputer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800 or processor(s) 804), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
receiving, by at least one computer processor, multi-publisher content item measurement data that comprises data signals for a plurality of content items from a plurality of different publishers that are presented at a plurality of different households;
determining, based on the multi-publisher content item measurement data, a content item from among the plurality of content items is to be transmitted to a media device of a particular household of the plurality of different households for presentation via a content publisher application of the media device; and
in response to determining that the content item is to be transmitted to the media device, transmitting the content item to the media device for presentation via the content publisher application of the media device.

2. The computer-implemented method of claim 1, wherein receiving the multi-publisher content item measurement data comprises:
receiving, via a data feed, first multi-publisher content item measurement data pertaining to one or more households in the plurality of different households for a first time period; and
receiving, via the data feed, second multi-publisher content item measurement data pertaining to one or more households in the plurality of different households for a second time period.

3. The computer-implemented method of claim 1, wherein the data signals comprise at least one of:
information concerning content item impressions with respect to the plurality of content items that occurred via the media device; or
information concerning content item impressions with respect to the plurality of content items that occurred at each of the plurality of different households at which other media devices are located.

4. The computer-implemented method of claim 3, wherein the information concerning the content item impressions with respect to the plurality of content items that occurred via the media device comprises a value that indicates that the content item impressions occurred via one of:
the content publisher application of the media device;
a third-party content publisher application of the media device; or
linear programming viewed via the media device.

5. The computer-implemented method of claim 3, wherein the data signals comprise at least one of:
information concerning user conversions with respect to the plurality of content items that was attributed to the particular household at which the media device is located; or
information concerning user conversions with respect to the plurality of content items that was attributed to each of the plurality of different households at which other media devices are located.

6. The computer-implemented method of claim 1, wherein determining the content item is to be transmitted to the media device comprises:
determining, based at least on the multi-publisher content item measurement data, that presenting the content item via the content publisher application of the media device will increase an incremental reach of a campaign associated with the content item.

7. The computer-implemented method of claim 1, wherein determining the content item is to be transmitted to the media device comprises:
determining, based at least on the multi-publisher content item measurement data, that presenting the content item via the content publisher application of the media device will increase a probability of a user conversion.

8. The computer-implemented method of claim 1, wherein determining the content item is to be transmitted to the media device comprises:
providing, as an input, an identifier of a content item of the plurality of content items to a machine learning model;
obtaining, from the machine learning model, a confidence level for the content item indicating at least one of a likelihood that presenting the content item via the content publisher application of the media device will increase an incremental reach of a campaign associated with the content item or a likelihood that presenting the content item via the content publisher application of the media device will increase a probability of a user conversion; and
determining that the content item is to be transmitted to the media device based on the confidence level meeting a predetermined threshold, wherein the machine learning model is trained based at least on the multi-publisher content item measurement data.

9. A system, comprising:
one or more memories; and
at least one processor each coupled to at least one of the one or more memories and configured to perform operations comprising:
receiving multi-publisher content item measurement data that comprises data signals for a plurality of content items from a plurality of different publishers that are presented at a plurality of different households;
determining, based on the multi-publisher content item measurement data, a content item from among the plurality of content items is to be transmitted to a media device of a particular household of the plurality of different households for presentation via a content publisher application of the media device; and in response to determining that the content item is to be transmitted to the media device, transmitting the content item to the media device for presentation via the content publisher application of the media device.

10. The system of claim 9, wherein receiving the multi-publisher content item measurement data comprises:

receiving, via a data feed, first multi-publisher content item measurement data pertaining to one or more households in the plurality of different households for a first time period; and receiving, via the data feed, second multi-publisher content item measurement data pertaining to one or more households in the plurality of different households for a second time period.

11. The system of claim 9, wherein the data signals comprise at least one of:

information concerning content item impressions with respect to the plurality of content items that occurred via the media device; or information concerning content item impressions with respect to the plurality of content items that occurred at each of the plurality of different households at which other media devices are located.

12. The system of claim 11, wherein the information concerning the content item impressions with respect to the plurality of content items that occurred via the media device comprises a value that indicates that the content item impressions occurred via one of:

the content publisher application of the media device;

a third-party content publisher application of the media device; or linear programming viewed via the media device.

13. The system of claim 11, wherein the data signals comprise at least one of:

information concerning user conversions with respect to the plurality of content items that was attributed to the particular household at which the media device is located; or information concerning user conversions with respect to the plurality of content items that was attributed to each of the plurality of different households at which other media devices are located.

14. The system of claim 9, wherein determining the content item is to be transmitted to the media device comprises:

determining, based at least on the multi-publisher content item measurement data, that presenting the content item via the content publisher application of the media device will increase an incremental reach of a campaign associated with the content item.

15. The system of claim 9, wherein determining the content item is to be transmitted to the media device comprises:

determining, based at least on the multi-publisher content item measurement data, that presenting the content item via the content publisher application of the media device will increase a probability of a user conversion.

16. The system of claim 9, wherein determining the content item is to be transmitted to the media device comprises:

providing, as an input, an identifier of a content item of the plurality of content items to a machine learning model;

obtaining, from the machine learning model, a confidence level for the content item indicating at least one of a likelihood that presenting the content item via the content publisher application of the media device will increase an incremental reach of a campaign associated with the content item or a likelihood that presenting the content item via the content publisher application of the media device will increase a probability of a user conversion; and determining that the content item is to be transmitted to the media device based on the confidence level meeting a predetermined threshold, wherein the machine learning model is trained based at least on the multi-publisher content item measurement data.

17. A non-transitory computer-readable medium having instructions stored thereon that, when executed by at least one computing device, cause the at least one computing device to perform operations comprising:

receiving multi-publisher content item measurement data that comprises data signals for a plurality of content items from a plurality of different publishers that are presented at a plurality of different households;

determining, based on the multi-publisher content item measurement data, a content item from among the plurality of content items is to be transmitted to a media device of a particular household of the plurality of different households for presentation via a content publisher application of the media device; and in response to determining that the content item is to be transmitted to the media device, transmitting the content item to the media device for presentation via the content publisher application of the media device.

18. The non-transitory computer-readable medium of claim 17, wherein receiving the multi-publisher content item measurement data comprises:

receiving, via a data feed, first multi-publisher content item measurement data pertaining to one or more households in the plurality of different households for a first time period; and receiving, via the data feed, second multi-publisher content item measurement data pertaining to one or more households in the plurality of different households for a second time period.

19. The non-transitory computer-readable medium of claim 17, wherein the data signals comprise at least one of:

information concerning content item impressions with respect to the plurality of content items that occurred via the media device; or information concerning content item impressions with respect to the plurality of content items that occurred at each of the plurality of different households at which other media devices are located.

20. The non-transitory computer-readable medium of claim 19, wherein the information concerning the content item impressions with respect to the plurality of content items that occurred via the media device comprises a value that indicates that the content item impressions occurred via one of:

the content publisher application of the media device;

a third-party content publisher application of the media device; or linear programming viewed via the media device.

* * * * *